Aug. 5, 1952      G. E. CUTTAT      2,605,538
AUTOMATIC LATHE WITH REVOLVING TURRET

Filed Feb. 21, 1948      3 Sheets-Sheet 1

Aug. 5, 1952 G. E. CUTTAT 2,605,538
AUTOMATIC LATHE WITH REVOLVING TURRET
Filed Feb. 21, 1948 3 Sheets-Sheet 2

Aug. 5, 1952   G. E. CUTTAT   2,605,538
AUTOMATIC LATHE WITH REVOLVING TURRET
Filed Feb. 21, 1948   3 Sheets-Sheet 3

Patented Aug. 5, 1952

2,605,538

UNITED STATES PATENT OFFICE 2,605,538

AUTOMATIC LATHE WITH REVOLVING TURRET

Georges Emile Cuttat, Geneva, Switzerland, assignor to Manufacture De Machines Du Haut-Rhin, Mulhouse-Bourtzwiller, France Application February 21, 1948, Serial No. 10,153
In France March 13, 1947

5 Claims. (Cl. 29—39)

This invention relates to lathes with revolving turrets and has for its object to provide auxiliary machining means mounted on the frame of such a lathe for additional machining of work preformed by said lathe, and work gripping means mounted on the turret of said lathe for picking up said work from a chuck on the lathe when the turret is in one position and, when in another position, presenting the same to said machining means to be additionally machined hereby.

According to one feature of the present invention said auxiliary machining means consist essentially of an electrically driven tool adapted for desired additional machining of the work in point and a displaceable holding device forming part of said machining means and adapted to receive the work from the aforesaid gripping means, hold the same during said machining and eject the work after this machining.

According to a further feature of the present invention the lathe turret is provided with work gripping means whereby the work picked up from the lathe is presented to, and taken up by, the holding device of aforesaid machining means in a position diametrically inverted with respect to its previous position on the lathe, such inverted position of the work being immaterial if desired additional machining is other than for example unilateral drilling.

According to yet a further feature of the present invention the lathe turret is provided with work gripping means whereby the work picked up from a chuck on the lathe is caused, during the subsequent rotation of the turret, to turn axially through 180 degrees and, consequently, presents itself to the holding device of said auxiliary machining means in a position identical with its previous position on the lathe and suitable for any desired additional machining.

The operational motions of the aforesaid auxiliary machining means are controlled preferably from the camshaft of the lathe, in accordance with the operational motions of the lathe and its turret.

Further features of the present invention will be apparent from the following description and appended claims.

The invention will be described with reference to the accompanying diagrammatic drawings in which:

Fig. 4 is a view partly similar to Fig. 1, showing a further form of work gripping arrangement revolved by the lathe turret according to the present invention;

In Figs. 1 to 4, inclusive, similar numerals of reference indicate like parts throughout the several views.

Figure 1:
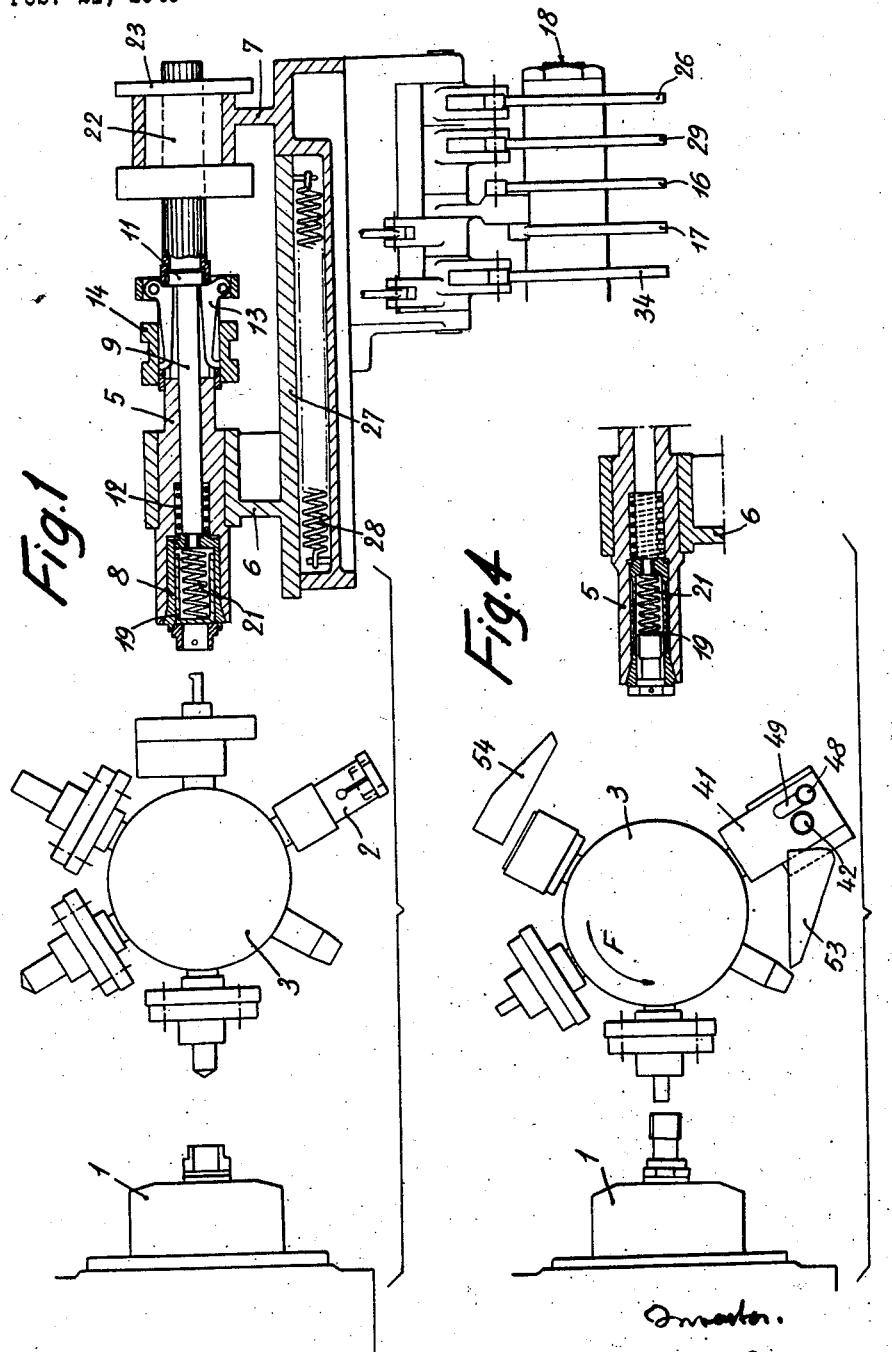
Fig. 1 is an elevational view, partly in section, showing in operative combination a lathe, its revolving turret, a form of work gripping arrangement revolved by said turret, and auxiliary machining means added thereto according to the present invention.

Just before being severed from bar, if any, the work-piece is gripped on the chuck 1 by means of a prehensile device of any known construction 2 provided on one of the fixtures of the lathe turret 3. In the course of revolution of the turret 3 the said work-piece is presented to the auxiliary machining appliance located at the right of Fig. 1 and provided, e. g., with a driller 4 (Fig. 3) adapted to operate at right angles to the work.

Said auxiliary machining appliance comprises a spindle 5 mounted in bearings 6, 7 one of each, 6, is displaceable and the other, 7, stationary. Located within the spindle 5 is a resilient gripping device 8 having its outward end externally cone-shaped, cooperating with the internally cone-shaped end of the spindle 5. The gripping device 8 is attached to one end of the shaft 9 the other end of which is provided with a flange 11. A spring 12 tends to push the gripping device 8 to the left into releasing position. The gripping effect is secured by dogs 13 which tend to move away from each other and cooperate with a gripping sleeve 14 controlled by a lever 15 (Fig. 3) which in turn is controlled, through appropriate intermediate means, by two cams: 16 for gripping and 17 for releasing, these two cams being keyed to the camshaft 18 which is preferably the general camshaft of the lathe. It will be seen that in the position shown in Fig. 1 the sleeve 14 acts upon the free ends of the dogs 13 and these, by pushing the flange 11 from the left to the right, exert a pull on the shaft 9 so that the device 8 is caused to produce a gripping effect. When the sleeve 14 is moved from the left to the right the free ends of the dogs 13 get loose and the dogs let go their hold on the flange 11, whereby the device 8 is thrown out of grip.

Located within the holder 8 is a bushing 19 urged by a spring 21. This bushing serves to eject the work when the holder gets loose. In Fig. 1 the bushing 19 is shown in its position of ejection and in Fig. 4 in its retracted position.

Mounted at the spindle end and supported by the stationary bearing 7 is a divider 22 of any suitable type that permits of imparting angular displacements to the spindle and hence to the work, if the latter has several holes to be drilled in it or various facets to be milled on it at regular angular distances. Said divider has at its outward end a disk 23 provided with one or more notches and controlled by an indicator of position 24 (Fig. 2) pivoted to the machine frame and acted upon by a dash-pot 25. Automatic motions of the divider are brought about, through appropriate intermediate means, by a cam 26 (Fig. 1) keyed to the shaft 18.

The displacement bearing 6 is mounted on a part 27 that may slide with respect to the stationary bearing 7 and is constantly acted upon by a spring 28 one end of which is attached to it, while the other end thereof is attached to a part rigid with the stationary bearing 7. The displacements of the bearing 6 are controlled, through appropriate intermediate means, by the cam 29 in one direction and by the cam 28 in the other direction. To permit displacements of the movable bearing 6 the spindle, which is rigid with the divider 22 for rotation, may be given a motion of translation with respect thereto by means of longitudinal grooving.

Figure 2:
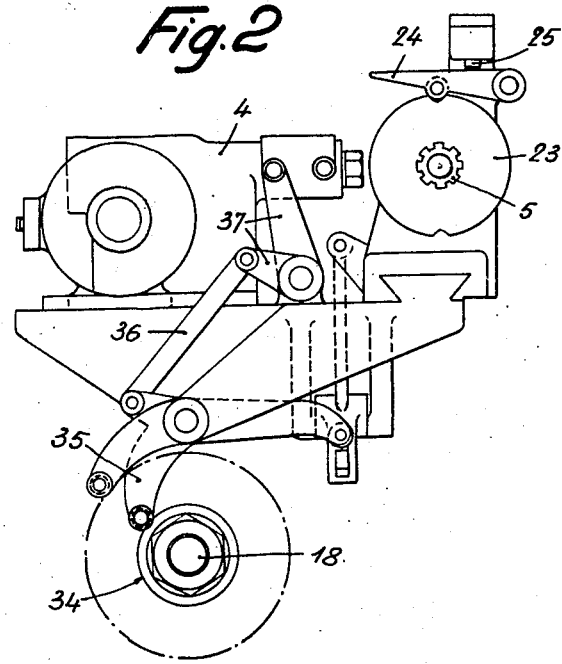
Fig. 2 is a rear view of the auxiliary machining means of Fig. 1.
Figure 3:
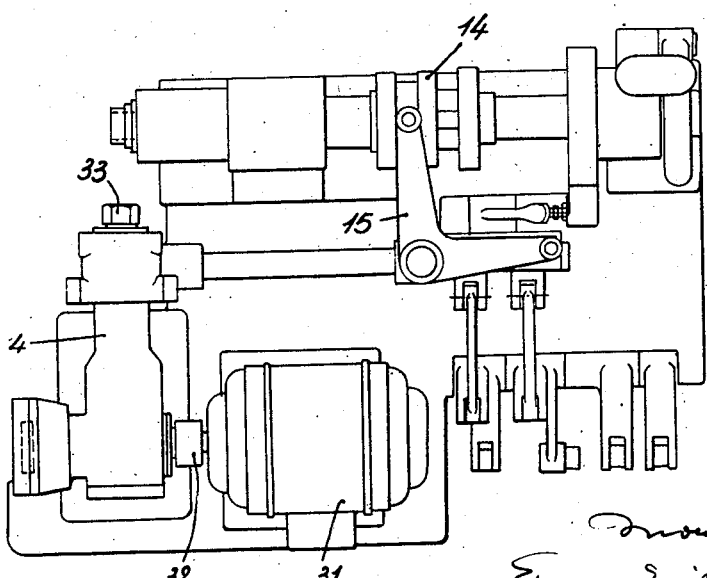
Fig. 3 is a plan view of the auxiliary machining means of Figs. 1 and 2.

In the example of auxiliary machining means illustrated in Figs. 2 and 3, the work handled is supposed to be subjected to drilling by means of a driller 4 driven by an individual electric motor 31 which, through the medium of a coupling 32 and appropriate gearing, rotates a tool-holder 33. Feeding and withdrawal of the tool-holder and its tool are determined by a cam 34, elbowed lever 35, connecting rod 36 and elbowed lever 37.

In the mode of construction of the apparatus that has just been described, the work-piece handled is presented, for the purpose of being charged into the auxiliary machining means, diametrally inverted with respect to the diametral position in which it was on the chuck.

In the modes of construction shown in Figs. 4 to 8, inclusive, the work in point, while passing from its position on the chuck to its position of charging into the auxiliary machining means, is caused to turn axially through 180 degrees so that it presents itself to the auxiliary machining means in the same situation as on the chuck.

To this end, the gripping device 2 shown in Fig. 1 is replaced by a carrier constituted by a fixed fork 41 in which there is arranged a box 43 pivoting on two journals 42 and 42'. Arranged within the box 43 is a yieldable gripping device 44 adapted to grip the work-piece 45 additionally maintained by lever arms 46 urged by springs 47. One of the journals, 42, is provided with teeth in mesh with a rack 50 (Figs. 5 and 7) slidable in a bore managed in the fork 41, said rack being provided with an external button 48 adapted to move in a longitudinal guide-slot 49 managed in the fork 41 over the rack 50. The box 43 is provided with outward sharp depressions cooperating with corresponding centering pistons 51 urged by return-springs 52 (Fig. 8) so as to assure to the box 43 two well determined positions with respect to the fork 41. The button 48 cooperates with two stationary inclines 53, 54 located at suitable points around the revolving turret 3 (Fig. 4).

Figure 6:
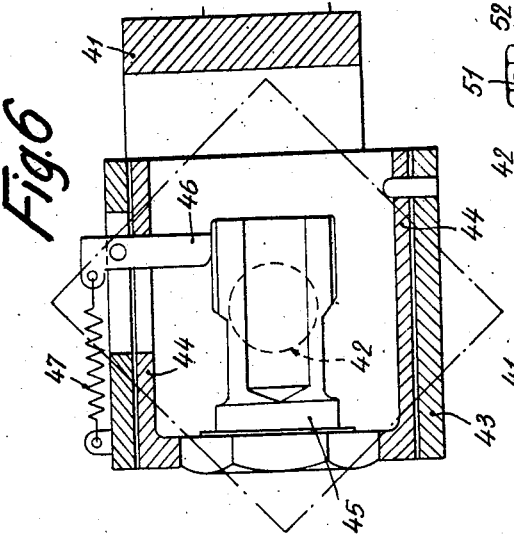
Figs. 6, 7 and 8 are detail views corresponding to Fig. 5.
Figure 8:
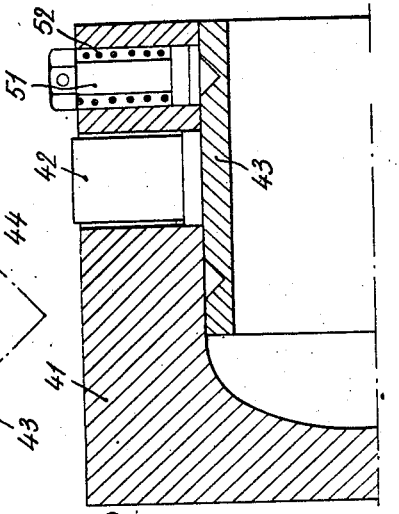
Figure 5:
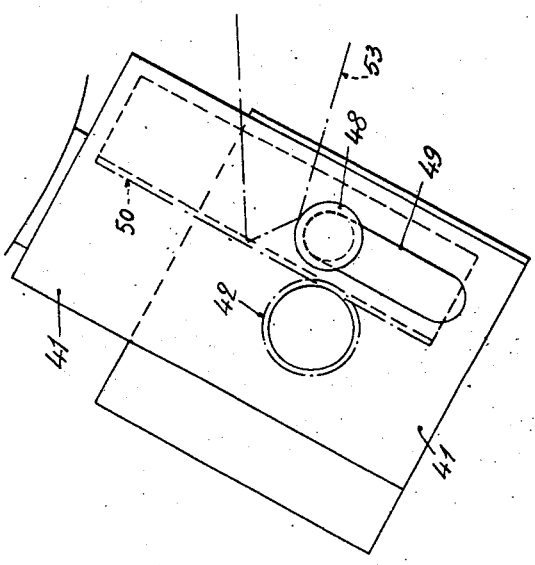
Fig. 5 is an enlarged external view of the form of work gripping arrangement of Fig. 4.
Figure 7:
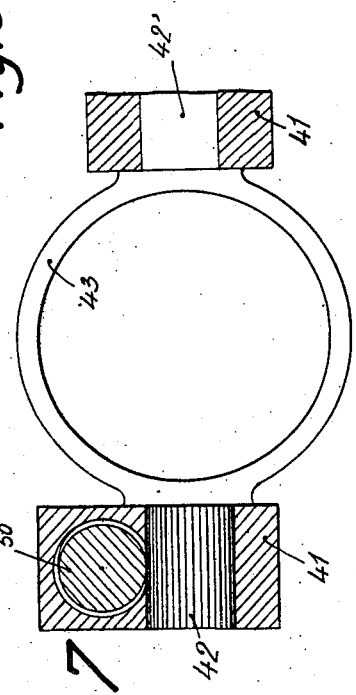

The operation of this carrier is readily understandable. In Fig. 5 there is shown the moment that, in the course of rotation of the revolving turret 3 in the sense of arrow F (Fig. 4), the button 48 comes in contact with the incline 53. Following this incline the button moves along the guide-slot 49 and drags with it the rack 50 which by acting upon the journal 42, causes the box 43 to rotate through 180 degrees. In Fig. 6 there is indicated by dash-and-dot lines an intermediate position of the box. At the moment of leaving the incline 53, the button 48 is at the external end of the guide-slot 49. The incline 54, which is located beyond the position of discharge, will cause the carrier box to return to its initial position.

By suppressing the inclines 53 and 54 there would also be suppressed the advantage of turning the work longitudinally through 180 degrees, what would amount to coming back to the case of Fig. 1.

What is claimed is:

1. In an automatic lathe having a frame, the combination of a first chuck and a tool-carrying turret revolubly mounted on the frame; a second chuck rotatably mounted on said frame; prehensile means mounted on the turret for transferring a work piece from the first chuck to the second chuck when said turret is rotated through a movement of 180°; and an auxiliary machining unit mounted on the frame of said lathe for machining said work piece when supported in said second chuck.

2. In an automatic lathe, the combination of a first chuck and a tool-supporting turret revolubly mounted on the lathe; a second chuck rotatably mounted on said lathe; prehensile means operably mounted on the turret for transferring a work piece from the first chuck to the second chuck when said turret revolves through substantially 180°; and an auxiliary machining unit mounted on said lathe and including a rotatable tool having an axis of rotation extending in an angular direction with respect to the longitudinal operating axis of said lathe.

3. In an automatic lathe having a frame, the combination of a first chuck and a tool-carrying turret revolubly mounted on the frame; a second chuck rotatably mounted on said frame; prehensile means mounted on the turret for transferring a work piece from the first chuck to the second chuck when said turret is rotated through a movement of 180°; means cooperating with said prehensile means for effecting reversal of the work piece through a movement of 180° during the transferring operation of said turret; and an auxiliary rotary tool slidably mounted upon said lathe and adapted to engage said work piece when supported in said second chuck in a direction disposed at an angle to the longitudinal operating axis of said lathe.

4. In an automatic lathe having a frame, the combination of a first chuck and a tool-carrying turret revolubly mounted on the frame; a second chuck rotatably mounted on said frame; prehensile means mounted on the turret for transferring a work piece from the first chuck to the second chuck when said turret is rotated through a movement of 180°; means cooperating with said prehensile means for effecting reversal of the work piece through a movement of 180° during the transferring operation of said turret; and an auxiliary machining unit mounted on the frame of said lathe for machining said work piece when the latter is supported in said second chuck in the same relative spatial position as when supported in the first chuck.

5. In an automatic lathe having a frame, the combination of a first chuck and a tool-carrying turret revolubly mounted on the frame; a second chuck rotatably mounted on said frame; a rigid member fixed on the periphery of the turret; a cage pivotally mounted on the rigid member; prehensile means supported in the cage for gripping and releasing a work piece; means operatively disposed in proximate association with the cage for effecting reversal of said cage through a movement of 180° during revolution of said turret for transferring the work piece from the first chuck to the second chuck; and an auxiliary machining unit mounted on the frame of said lathe for machining said work piece when the latter is supported in said second chuck in the same relative spatial position as when supported in the first chuck.

GEORGES EMILE CUTTAT.

REFERENCES CITED

The following references are of record in the file of this patent:

UNITED STATES PATENTS

| Number | Name | Date |
| --- | --- | --- |
| 409,786 | Hartness | Aug. 27, 1889 |
| 607,693 | Lavigne | July 19, 1898 |
| 1,592,009 | Simpson | July 13, 1926 |
| 1,904,493 | Mathias | Apr. 18, 1933 |
| 1,961,868 | Staubo | June 5, 1934 |
| 2,128,186 | Jones | Aug. 23, 1938 |
| 2,236,047 | Wuttleworth | Mar. 25, 1941 |
| 2,360,906 | Smith | Oct. 24, 1944 |